US011895004B2

(12) United States Patent
Tillman et al.

(10) Patent No.: US 11,895,004 B2
(45) Date of Patent: Feb. 6, 2024

(54) SYSTEMS AND METHODS FOR HEURISTICS-BASED LINK PREDICTION IN MULTIPLEX NETWORKS

(71) Applicant: JPMORGAN CHASE BANK, N.A., New York, NY (US)

(72) Inventors: Robert Elliott Tillman, Long Island City, NY (US); Prashant P. Reddy, Madison, NJ (US); Maria Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 341 days.

(21) Appl. No.: 17/407,454

(22) Filed: Aug. 20, 2021

(65) Prior Publication Data

US 2022/0060404 A1 Feb. 24, 2022

Related U.S. Application Data

(60) Provisional application No. 63/068,288, filed on Aug. 20, 2020.

(51) Int. Cl.
*H04L 12/751* (2013.01)
*H04L 45/02* (2022.01)
*G06N 3/08* (2023.01)
*G06N 5/01* (2023.01)

(52) U.S. Cl.
CPC .............. *H04L 45/02* (2013.01); *G06N 3/08* (2013.01); *G06N 5/01* (2023.01)

(58) Field of Classification Search
CPC ............. H04L 45/02; G06N 5/01; G06N 3/08

USPC ......................................................... 370/254
See application file for complete search history.

(56) References Cited

U.S. PATENT DOCUMENTS

| 10,581,736 | B1 * | 3/2020 | Choudhury | ......... H04L 43/0876 |
| 2018/0103052 | A1 * | 4/2018 | Choudhury | ............. H04L 63/20 |
| 2018/0309636 | A1 * | 10/2018 | Strom | .................... H04L 41/122 |
| 2019/0303535 | A1 * | 10/2019 | Fokoue-Nkoutche | ....................... G06F 17/16 |
| 2020/0015121 | A1 * | 1/2020 | Misra | ................. H04W 28/0231 |

(Continued)

*Primary Examiner* — Christopher M Crutchfield
*Assistant Examiner* — Jean F Voltaire
(74) *Attorney, Agent, or Firm* — GREENBERG TRAURIG LLP

(57) ABSTRACT

A method for heuristics-based link prediction in multiplex networks may include a link prediction computer program: receiving a model for a multiplex network; defining a property matrix that specifies feature for cross-layer correlation; constructing a cross-correlation matrix from the property matrix; applying a count and weight correlation heuristic to the cross-correlation matrix, wherein the count and weight correlation heuristic counts a number of layers that contain a link between two nodes, and weights that count according to cross-layer correlations; applying a correlation weighted heuristic to the cross-correlation matrix; applying a count correlation-weighted heuristic to the cross-correlation matrix that counts the number of layers that contain a link between two nodes and weights that count according to both cross-layer correlations and values resulting from evaluating a monoplex heuristic applied to each layer in the multiplex network, resulting in output values; and identifying a missing link based on the output values.

20 Claims, 3 Drawing Sheets

(56) References Cited

U.S. PATENT DOCUMENTS

2020/0125967 A1* 4/2020 Seo .................... G06N 20/00
2021/0021616 A1* 1/2021 Shabtai ................ H04L 63/145

* cited by examiner

SYSTEMS AND METHODS FOR HEURISTICS-BASED LINK PREDICTION IN MULTIPLEX NETWORKS

RELATED APPLICATIONS

This application claims priority to, and the benefit of, U.S. Provisional Patent Application Ser. No. 63/068,288 filed Aug. 20, 2020, the disclosure of which is hereby incorporated, by reference, in its entirety.

BACKGROUND OF THE INVENTION

1. Field of the Invention

Embodiments are generally directed to systems and methods for heuristics-based link prediction in multiplex networks.

2. Description of the Related Art

Link prediction, or the inference of future or missing connections between entities, is a well-studied problem in network analysis. A multitude of heuristics exist for link prediction in ordinary networks with a single type of connection. However, link prediction in multiplex networks, or networks with multiple types of connections, is not a well-understood problem.

SUMMARY OF THE INVENTION

Systems and methods for heuristics-based link prediction in multiplex networks are disclosed. In one embodiment, a method for heuristics-based link prediction in multiplex networks may include: (1) receiving, by a link prediction computer program executed by a computer processor, a model for a multiplex network; (2) defining, by the link prediction computer program, a property matrix that specifies feature for cross-layer correlation; (3) constructing, by the link prediction computer program, a cross-correlation matrix from the property matrix; (4) applying, by the link prediction computer program, a count and weight correlation heuristic to the cross-correlation matrix, wherein the count and weight correlation heuristic counts a number of layers that contain a link between two nodes, and weights that count according to cross-layer correlations; (5) applying, by the link prediction computer program, a correlation weighted heuristic to the cross-correlation matrix; (6) applying, by the link prediction computer program, a count correlation-weighted heuristic to the cross-correlation matrix that counts the number of layers that contain a link between two nodes and weights that count according to both cross-layer correlations and values resulting from evaluating a monoplex heuristic applied to each layer in the multiplex network, resulting in output values; and (7) identifying, by the link prediction computer program, a missing link based on the output values.

In one embodiment, the model for the multiplex network may include a plurality of matrices, with each matrix representing a layer in the multiplex network.

In one embodiment, a 1 in the property matrix may indicate a presence of a link between each node pair in the multiplex network, and a 0 in the property matrix may indicate an absence of a link between each node pair in the multiplex network.

In one embodiment, the method may further include changing, by the link prediction computer program, a 0 in the property matrix to a 1 for the missing link.

In one embodiment, the method may further include reducing, by the link prediction computer program, statistical noise in the output values.

In one embodiment, the link prediction computer program may identify the missing link in response to the output value for two nodes being above a threshold.

In one embodiment, the method may further include training, by the link prediction computer program, a supervised machine learning algorithm for classification.

In one embodiment, the supervised machine learning algorithm may include logistic regression, gradient boosting, or feed-forward neural networks.

In one embodiment, the method may further include identifying, by the link prediction computer program, a plurality of missing links; and ranking, by the link prediction computer program, the plurality of missing links based the output values of the count correlation-weighted heuristic.

In one embodiment, the method may further include outputting, by the link prediction computer program, a top k missing links based on the ranking.

According to another embodiment, an electronic device may include a memory storing a link prediction computer program and a computer processor. When executed by the computer processor, the link prediction computer program may cause the computer processor to perform the following: receive a model for a multiplex network; define a property matrix that specifies feature for cross-layer correlation; construct a cross-correlation matrix from the property matrix; apply a count and weight correlation heuristic to the cross-correlation matrix, wherein the count and weight correlation heuristic counts a number of layers that contain a link between two nodes, and weights that count according to cross-layer correlations; apply a correlation weighted heuristic to the cross-correlation matrix; apply a count correlation-weighted heuristic to the cross-correlation matrix that counts the number of layers that contain a link between two nodes and weights that count according to both cross-layer correlations and values resulting from evaluating a monoplex heuristic applied to each layer in the multiplex network, resulting in output values; and identify a missing link based on the output values.

In one embodiment, the model for the multiplex network may include a plurality of matrices, with each matrix representing a layer in the multiplex network.

In one embodiment, a 1 in the property matrix may indicate a presence of a link between each node pair in the multiplex network, and a 0 in the property matrix may indicate an absence of a link between each node pair in the multiplex network.

In one embodiment, the link prediction computer program may further cause the computer processor to change a 0 in the property matrix to a 1 for the missing link.

In one embodiment, the link prediction computer program may further cause the computer processor to reduce statistical noise in the output values.

In one embodiment, the link prediction computer program may identify the missing link in response to the output value for two nodes being above a threshold.

In one embodiment, the link prediction computer program may further cause the computer processor to train a supervised machine learning algorithm for classification.

In one embodiment, the supervised machine learning algorithm may include logistic regression, gradient boosting, or feed-forward neural networks.

In one embodiment, the link prediction computer program further causes the computer processor to: identify a plurality of missing links; and rank the plurality of missing links based the output values of the count correlation-weighted heuristic.

In one embodiment, the link prediction computer program further causes the computer processor to output a top k missing links.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

The disclosure of Robert Tillman et al., "Heuristics for Link Prediction in Multiplex Networks," (2020) available at arxiv.org/abs/2004.04704v1 is hereby incorporated, by reference, in its entirety.

Embodiments are directed to a framework and three families of heuristics for multiplex network link prediction that are simple, interpretable, and take advantage of the rich connection type correlation structure that exists in many real-world networks. Embodiments may derive a theoretical threshold for determining when to use a different connection type based on the number of links that overlap with a random graph.

Embodiments may have applicability with, for example, transportation networks, global trade networks, social networks, financial transaction networks (e.g., identification of fraudulent and/or illegal transactions), computer networks, etc. Embodiments provide increased performance with the richness of connection type correlation structure and significantly outperform their baseline heuristics for ordinary networks with a single connection type.

Figure 1:
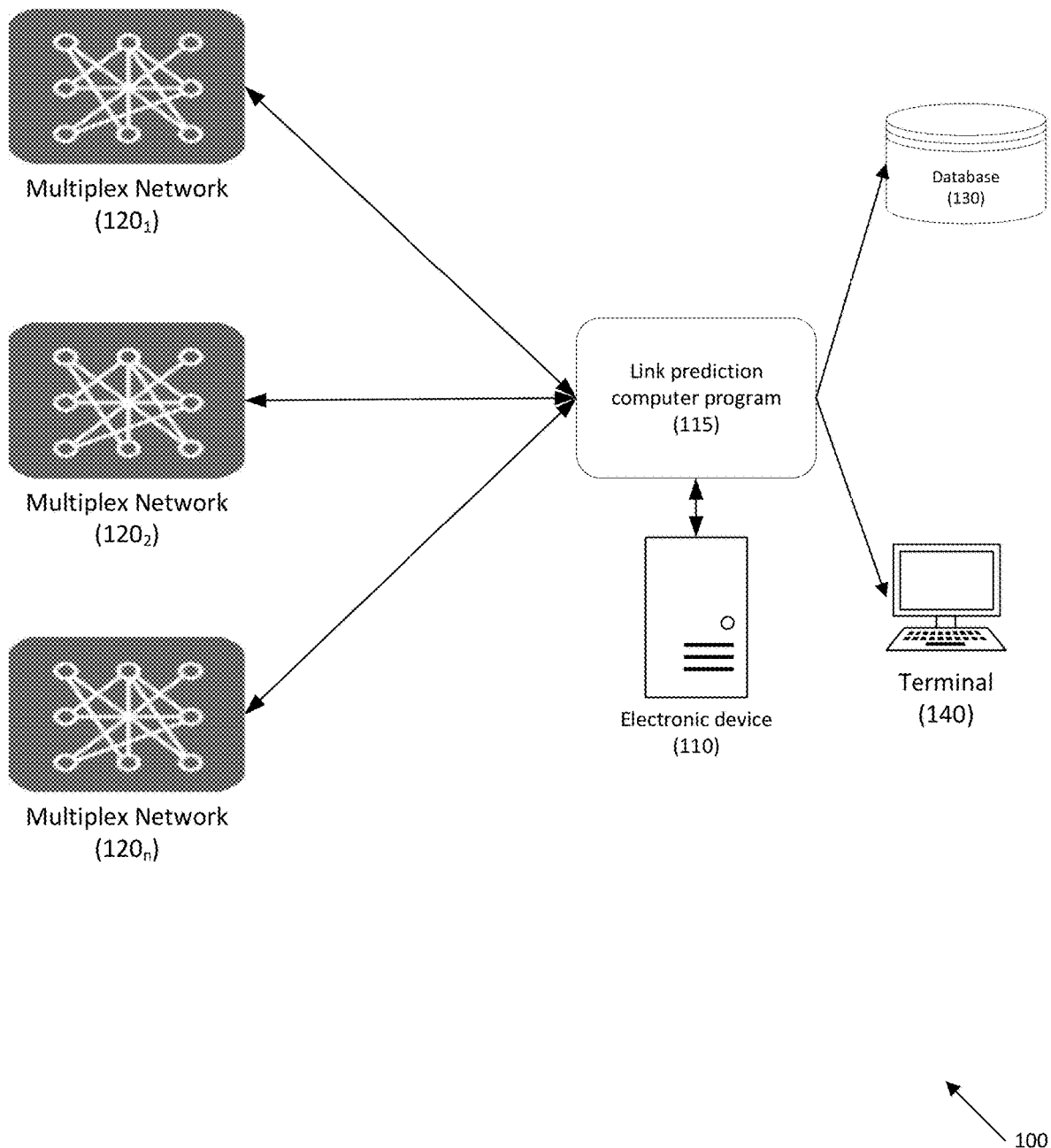
FIG. 1 depicts a system for heuristics-based link prediction in multiplex networks according to one embodiment.

Referring to FIG. 1, a system for heuristics-based link prediction in multiplex networks is disclosed according to an embodiment. System 100 may include electronic device 110, which may be any suitable electronic device that may execute link prediction computer program 115. For example, electronic device 110 may be a server (physical and/or cloud based), workstations, desktops, laptops, notebooks, tablets, etc.

Link prediction computer program 115 may interface with one or more multiplex networks 120 and to provide multi-network link prediction. Link prediction computer program 115 may interface with database 130 and terminal 140. In one embodiment, link prediction computer program 115 may retrieve historic data from database 130 as is necessary and/or desired.

Terminal 140 may receive the output of link prediction computer program.

In one embodiment, multiplex networks 120 may be any network that may be represented with nodes and edges connecting the nodes. Examples of networks include transportation networks, global trade networks, social networks, financial transaction networks, computer networks, communication networks, biological networks, etc. In one embodiment, the nodes in the multiplex network may have a plurality of types of interactions. For example, individuals may interact with multiple social networks, transit stations may be linked by different carriers, lines, or modes of transit. Each multiplex network 120 may have a plurality of layers, with each layer representing a certain type of interaction.

Figure 2:
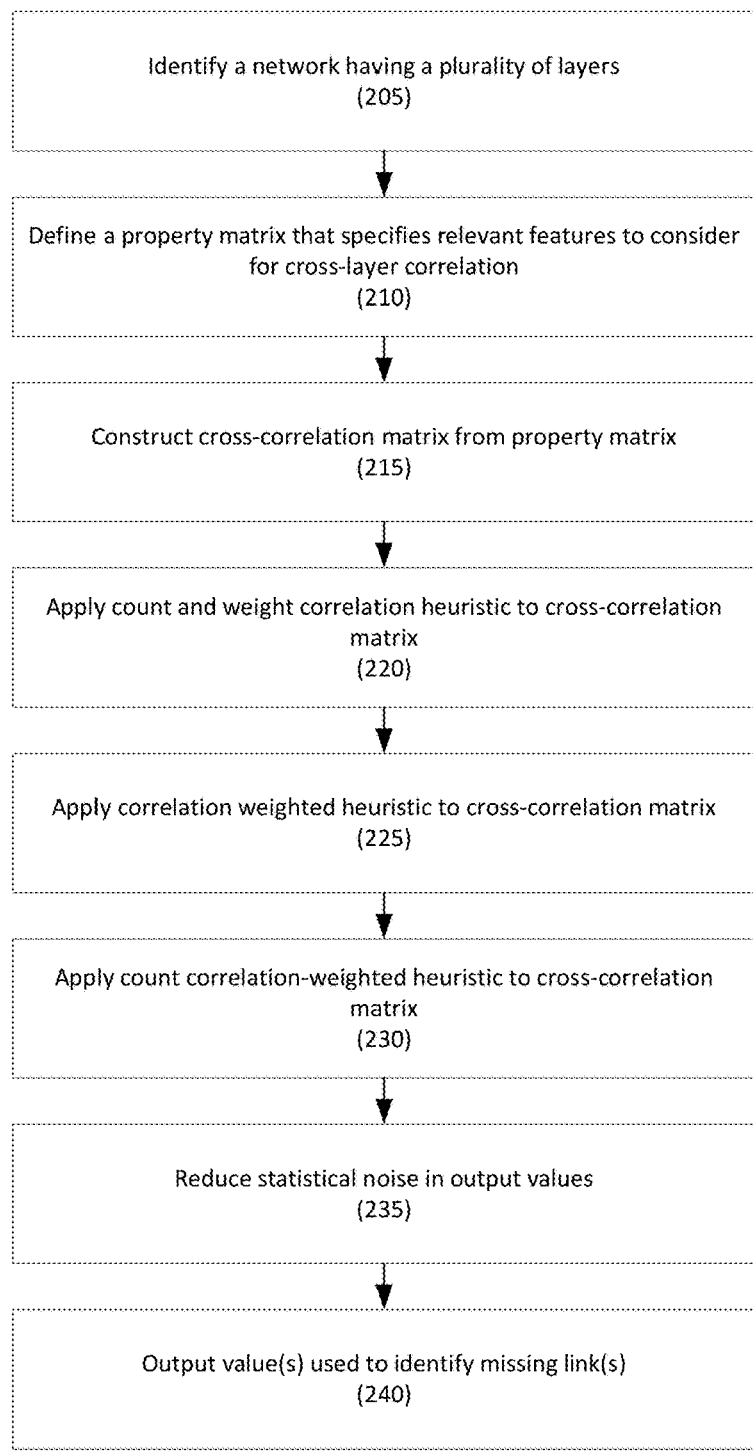
FIG. 2 depicts a method for heuristics-based link prediction in multiplex networks according to one embodiment.

Referring to FIG. 2, a method for heuristics-based link prediction in multiplex networks is disclosed according to one embodiment.

In step 205, a link prediction computer program executed by an electronic device may identify one or more multiplex network in which the nodes may have a plurality of types of interactions. As discussed above, each type of interaction may be represented by a layer.

In one embodiment, the link prediction computer program may receive a model of the multiplex network. For example, the multiplex network may be provided as a plurality of matrices, with each matrix representing a layer in the network.

Figure 3:
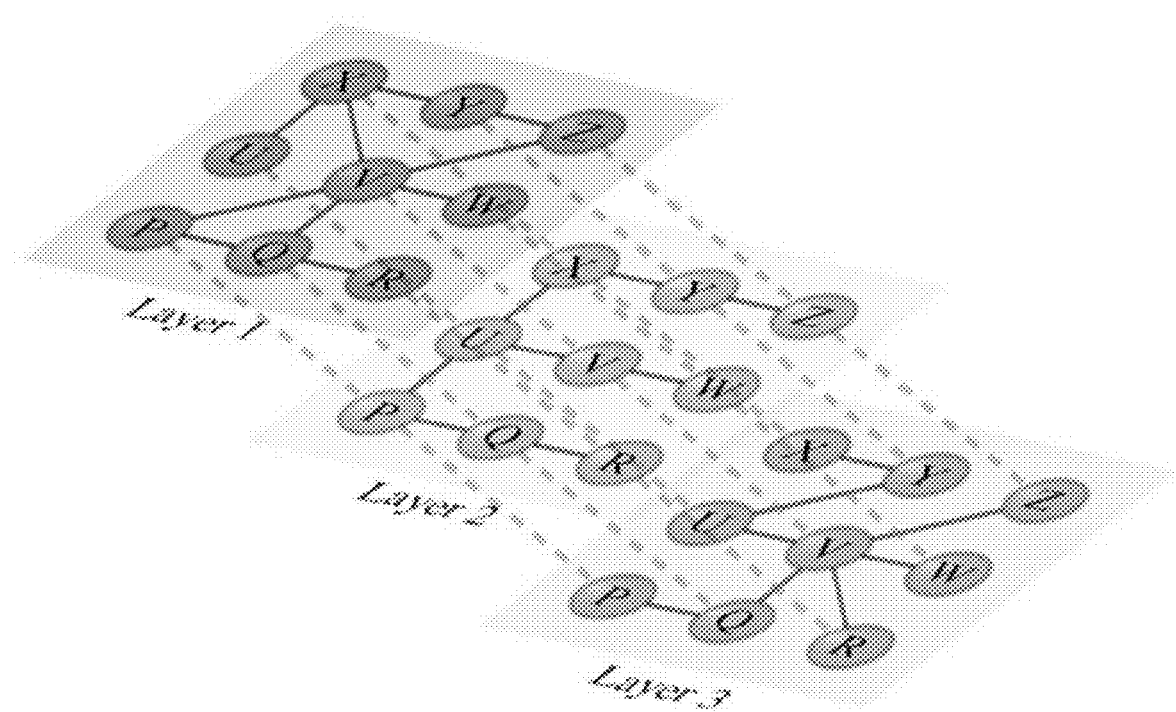
FIG. 3 depicts an exemplary multiplex network.

In step 210, a property matrix that specifies relevant features to consider for cross-layer correlation may be defined. For example, a property matrix P may be constructed having rows that represent layers in the network, and columns that represent unique node pairs. In one embodiment, a 1 may be used to indicate the presence of an edge between a node pair, and a 0 may indicate the absence of an edge. For example, for the exemplary network of FIG. 3, which has three layers and nodes P, Q, R, U, V, W, X, Y, and Z, the property matrix P may be constructed as follows:

$$P = \begin{matrix} & \begin{matrix} X-Y & X-U & X-V \end{matrix} \\ \begin{matrix} \text{Layer 1} \\ \text{Layer 2} \\ \text{Layer 3} \end{matrix} & \begin{bmatrix} 1 & 1 & 1 & \dots \\ 1 & 1 & 0 & \dots \\ 1 & 0 & 0 & \dots \end{bmatrix} \end{matrix}$$

To compare layers in terms of shared hubs, the columns may represent nodes, and the entries indicate the node degree in each layer. For a property matrix P, $p^i$ may be used to indicate the property vector for the ith layer and $p^i_j$ the value in the jth column for layer i. By convention, all vectors may be treated as column vectors. When property matrices/vectors are defined in terms of shared edges or shared hubs, they may be referred to as edge property matrices/vectors or degree property matrices/vectors, respectively.

In step 215, a cross-correlation matrix C may be constructed from the property matrix having the dimensions k×x. The cross-correlation matrix may be constructed by setting the diagonal entries in the cross-correlation matrix C to 1 and the off-diagonal entries, $c_{i,j}$ to the value resulting from some correlation metric applied to the property vectors $p^i$ and $p^j$.

In step 220, a count and weight correlation (CWC) heuristic may be applied to the cross-correlation matrix. The CWC heuristic may count the number of layers that contain a link between two nodes, and weights that count according to the cross-layer correlations.

In one embodiment, for a multiplex network with edge property vectors $e^l, \ldots e^k$, and a cross-layer correlation matrix C, CWC is defined for a layer i and a possible edge represented by an edge property vector index j as follows:

$$\frac{1}{Z^i_C} \sum_{l=1}^{k} \begin{cases} e^l_j c_{i,l}, & c_{i,l} > 0 \\ (1 - e^l_j)|c_{i,l}|, & c_{i,l} < 0 \end{cases}$$

The CWC heuristic encodes the intuition that correlated layers should have similar links—the more correlated a layer that does not contain a particular link is to another layer which does contain that link, the more likely it is that link is missing or will develop in the future. The CWC heuristic also takes anti-correlation into account: a link is more likely to be predicted if it is missing from a layer which is anti-correlated.

The output of step 220 may be a value between 0 and 1 for each pair of distinct nodes and layer.

In step 225, a correlation weighted heuristic (CWH) may be applied to the cross-correlation matrix. The CWH extends the CWC heuristic to the multiplex domain by applying them across layers of a multiplex network and weighting them according to cross-layer correlations.

For a multiplex network with a cross-layer correlation matrix C, $h_j^l$ may be heuristic for monoplex networks evaluated at layer l of the multiplex network for a possible edge represented by an edge property vector index j. CWH is defined for a layer i and possible edge index j as follows:

$$\frac{1}{Z_C^i} \sum_{l=1}^{k} \begin{cases} h_j^l c_{i,l}, & c_{i,l} > 0 \\ (1 - h_j^l)|c_{i,l}|, & c_{i,l} < 0 \end{cases}$$

In one embodiment, the output of step 225 may be a value between 0 and 1 for each pair of distinct nodes and a layer.

In step 230, a count correlation-weighted heuristic (CCWH) may be applied to the cross-correlation matrix. CCWH combines the previous two heuristics, and (i) considers whether a link is present in a layer and (ii) applies a monoplex heuristic (i.e., a heuristic designed for a single-layer network, such as common neighbors) to a specific layer in the multilayer network. For example, the CCWH counts the number of layers that contain a link between two nodes and applies a weighting to that count according to both cross-layer correlations and the values resulting from evaluating the monoplex heuristic at each layer in the network.

For a multiplex network with edge property vectors $e^l, \ldots e^k$, and a cross-layer correlation matrix C, $h_j^l$ may be similarity heuristic for monoplex networks evaluated at layer l of the multiplex network for a possible edge represented by an edge property vector index j. CCWH is defined for a layer i and possible edge index j as follows:

$$\frac{1}{Z_C^i} \sum_{l=1}^{k} \begin{cases} h_j^i, & i = l \\ e_j^l h_j^i c_{i,l}, & c_{i,l} > 0 \\ (1 - e_j^l)(1 - h_j^i)|c_{i,l}|, & c_{i,l} < 0 \end{cases}$$

CCWH may also account for negative correlation: links are more likely if they are not present in an anti-correlated layer and the magnitudes of these predictions are inversely proportional to the values of the heuristic evaluated at that layer. The heuristic evaluated at the layer being predicted so that CCWH yields informative values even when there are no layers containing the edge being predicted.

In one embodiment, the output of the CCWH may be a value between 0 and 1 for each node pair. In one embodiment, the output of the CCWH may be a matrix.

It should be noted that the order in which the heuristics in steps 220, 225, and 230 are applied may vary as is necessary and/or desired. In addition, different, or additional, heuristics may be used as is necessary and/or desired.

In step 235, statistical noise in the output values may optionally be reduced. For example, a random graph model, such as the Erdos-Reyni random graph model, may be used to as a threshold to reduce statistical noise when computing the heuristics to improve their empirical performance. By reducing statistical noise, correlations that can be ignored because they are more likely the result of estimation error are identified.

In step 240, one or more output value for each node combination and layer may be compared to a threshold to identify any missing links. For example, an output for a single heuristic may be selected, the outputs of two or more heuristics may be averaged, weighted, etc. Any suitable method for selecting a value from one or more of the heuristic outputs may be used as is necessary and/or desired.

For example, as noted above, the initial graph of the links or the property matrix may have values of 0 or 1, indicating the absence or presence of an edge between a node pair. Using the output values of the CCWH, entries in the property matrix that have a 0 but have heuristic value above a threshold may be changed to 1s, indicating the presence of a missing link.

In one embodiment, the outputs may be used to train a supervised machine learning algorithm for link prediction and/or threshold determination. Examples include logistic regression, gradient boosting, feed-forward neural networks, etc. For example, the heuristics may serve as features that are used in a machine learning classifier that predicts the presence or absence of a link.

In another embodiment, the selected output value for each node combination and layers may be ranked based on the magnitude of the heuristic. The pairs identified as missing may be the top k pairs in the rankings (k may represent the number recommendations desired). For example, the top k pairs, i.e., those that are most likely to correspond to a missing link, may be selected.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for heuristics-based link prediction in multiplex networks, comprising:
    receiving, by a link prediction computer program executed by a computer processor, a model for a multiplex network;
    defining, by the link prediction computer program, a property matrix that specifies feature for cross-layer correlation;
    constructing, by the link prediction computer program, a cross-correlation matrix from the property matrix;
    applying, by the link prediction computer program, a count and weight correlation heuristic to the cross-correlation matrix, wherein the count and weight correlation heuristic counts a number of layers that contain a link between two nodes, and weights that count according to cross-layer correlations;
    applying, by the link prediction computer program, a correlation weighted heuristic to the cross-correlation matrix;
    applying, by the link prediction computer program, a count correlation-weighted heuristic to the cross-correlation matrix that counts the number of layers that contain a link between two nodes and weights that count according to both cross-layer correlations and values resulting from evaluating a monoplex heuristic applied to each layer in the multiplex network, resulting in output values; and
    identifying, by the link prediction computer program, a missing link based on the output values.

2. The method of claim 1, wherein the model for the multiplex network comprises a plurality of matrices, with each matrix representing a layer in the multiplex network.

3. The method of claim 1, wherein a 1 in the property matrix indicates a presence of a link between each node pair in the multiplex network, and a 0 in the property matrix indicates an absence of a link between each node pair in the multiplex network.

4. The method of claim 3, further comprising:
    changing, by the link prediction computer program, a 0 in the property matrix to a 1 for the missing link.

5. The method of claim 1, further comprising:
    reducing, by the link prediction computer program, statistical noise in the output values.

6. The method of claim 1, wherein the link prediction computer program identifies the missing link in response to the output value for two nodes being above a threshold.

7. The method of claim 1, further comprising:
    training, by the link prediction computer program, a supervised machine learning algorithm for classification.

8. The method of claim 7, wherein the supervised machine learning algorithm comprises logistic regression, gradient boosting, or feed-forward neural networks.

9. The method of claim 1, further comprising:
    identifying, by the link prediction computer program, a plurality of missing links; and
    ranking, by the link prediction computer program, the plurality of missing links based the output values of the count correlation-weighted heuristic.

10. The method of claim 9, further comprising:
    outputting, by the link prediction computer program, a top k missing links based on the ranking.

11. An electronic device, comprising:
    a memory storing a link prediction computer program; and
    a computer processor;
    wherein, when executed by the computer processor, the link prediction computer program causes the computer processor to perform the following:
    receive a model for a multiplex network;
    define a property matrix that specifies feature for cross-layer correlation;
    construct a cross-correlation matrix from the property matrix;
    apply a count and weight correlation heuristic to the cross-correlation matrix, wherein the count and weight correlation heuristic counts a number of layers that contain a link between two nodes, and weights that count according to cross-layer correlations;
    apply a correlation weighted heuristic to the cross-correlation matrix;
    apply a count correlation-weighted heuristic to the cross-correlation matrix that counts the number of layers that contain a link between two nodes and weights that count according to both cross-layer correlations and values resulting from evaluating a monoplex heuristic applied to each layer in the multiplex network, resulting in output values; and
    identify a missing link based on the output values.

12. The electronic device of claim 11, wherein the model for the multiplex network comprises a plurality of matrices, with each matrix representing a layer in the multiplex network.

13. The electronic device of claim 11, wherein a 1 in the property matrix indicates a presence of a link between each node pair in the multiplex network, and a 0 in the property matrix indicates an absence of a link between each node pair in the multiplex network.

14. The electronic device of claim 11, wherein the link prediction computer program further causes the computer processor to change a 0 in the property matrix to a 1 for the missing link.

15. The electronic device of claim 11, wherein the link prediction computer program further causes the computer processor to reduce statistical noise in the output values.

16. The electronic device of claim 11, wherein the link prediction computer program identifies the missing link in response to the output value for two nodes being above a threshold.

17. The electronic device of claim 11, wherein the link prediction computer program further causes the computer processor to train a supervised machine learning algorithm for classification.

18. The electronic device of claim 17, wherein the supervised machine learning algorithm comprises logistic regression, gradient boosting, or feed-forward neural networks.

19. The electronic device of claim 11, wherein the link prediction computer program further causes the computer processor to:
    identify a plurality of missing links; and
    rank the plurality of missing links based the output values of the count correlation-weighted heuristic.

20. The electronic device of claim 11, wherein the link prediction computer program further causes the computer processor to output a top k missing links.

* * * * *